United States Patent
Peebles et al.

(10) Patent No.: US 9,582,816 B2
(45) Date of Patent: Feb. 28, 2017

(54) SYSTEM AND METHODS FOR ENABLING SPONSORED DATA ACCESS ACROSS MULTIPLE CARRIERS

(71) Applicant: Tata Communications (America) Inc., Herndon, VA (US)

(72) Inventors: Brian Peebles, Cranford, NJ (US); Luke Kiernan, West Windsor, NJ (US)

(73) Assignee: Tata Communications (America) Inc., Herndon, VA (US)

( * ) Notice: Subject to any disclaimer, the term of this patent is extended or adjusted under 35 U.S.C. 154(b) by 0 days.

(21) Appl. No.: 14/628,443

(22) Filed: Feb. 23, 2015

(65) Prior Publication Data
US 2015/0242903 A1     Aug. 27, 2015

Related U.S. Application Data

(60) Provisional application No. 61/943,454, filed on Feb. 23, 2014.

(51) Int. Cl.
*H04W 4/24*     (2009.01)
*G06Q 30/02*    (2012.01)
(Continued)

(52) U.S. Cl.
CPC ..... *G06Q 30/0267* (2013.01); *G06Q 30/0273* (2013.01); *H04M 15/09* (2013.01);
(Continued)

(58) Field of Classification Search
CPC . H04W 4/24; H04W 4/26; H04M 2215/0192; H04M 15/09; H04M 15/66; H04M 12/1471; H04L 12/1475
(Continued)

(56) References Cited

U.S. PATENT DOCUMENTS

| | | | |
|---|---|---|---|
| 7,136,932 B1 | 11/2006 | Schneider | |
| 7,848,312 B2 * | 12/2010 | Zhang | G06Q 10/02 370/229 |

(Continued)

OTHER PUBLICATIONS

Authorized Officer: Lingfei Bai, "International Report on Patentability" issued in counterpart PCT Application No. PCT/US2015/017102, dated Sep. 1, 2016, Publisher: PCT.
(Continued)

*Primary Examiner* — Kevin Kim
(74) *Attorney, Agent, or Firm* — Kaplan Breyer Schwarz & Ottesen, LLP

(57) ABSTRACT

A service and system for providing sponsored data, wherein the data usage is not charged to a mobile subscriber but, rather, paid for by a sponsor. The system and service is mobile-operator neutral and exists separate and apart from any given mobile network. The system provides, to mobile network operators and sponsoring entities, a single domain name (TLD). The TLD is white-listed, in wild-card form, by the mobile network operator so that the operator will know to zero rate any data traffic associated with the TLD. Sponsoring entities are also provided with a unique identifier. The unique identifier is concatenated, as a pre-pend, to the TLD, thereby generating a FQDN that (1) identifies associated data traffic as being "sponsored" and (2) identifies the entity sponsoring the data. The system monitors data usage associated with each FQDN and prepares a bill that charges each sponsoring entity for the data usage associated with the particular FQDN.

19 Claims, 12 Drawing Sheets

(51) Int. Cl.
*H04W 4/26* (2009.01)
*H04M 15/00* (2006.01)

(52) U.S. Cl.
CPC ..... *H04M 15/805* (2013.01); *H04M 15/8044* (2013.01); *H04M 15/8083* (2013.01); *H04M 15/83* (2013.01); *H04M 15/8351* (2013.01); *H04M 15/84* (2013.01); *H04M 15/858* (2013.01); *H04W 4/24* (2013.01); *H04W 4/26* (2013.01); *H04M 15/8055* (2013.01); *H04M 2215/0192* (2013.01)

(58) Field of Classification Search
USPC .................................................. 455/405, 406
See application file for complete search history.

(56) References Cited

U.S. PATENT DOCUMENTS

| | | | | |
|---|---|---|---|---|
| 8,693,358 | B2* | 4/2014 | Hodges | G06Q 30/00 370/252 |
| 8,755,769 | B2* | 6/2014 | Aaltonen | G06F 17/30899 455/406 |
| 2009/0286521 | A1 | 11/2009 | Buczek et al. | |
| 2010/0191612 | A1 | 7/2010 | Raleigh | |
| 2012/0089461 | A1 | 4/2012 | Greenspan | |
| 2012/0155380 | A1* | 6/2012 | Hodges | G06Q 30/00 370/328 |
| 2013/0130643 | A1* | 5/2013 | Bacareza | H04L 29/06537 455/406 |
| 2015/0172899 | A1* | 6/2015 | Sharma | H04M 15/8083 455/406 |

OTHER PUBLICATIONS

Authorized Officer: Shane Thomas, "International Search Report and Written Opinion" issued in counterpart PCT Application No. PCT/US15/17102, dated Jun. 19, 2015, Publisher: PCT.

\* cited by examiner

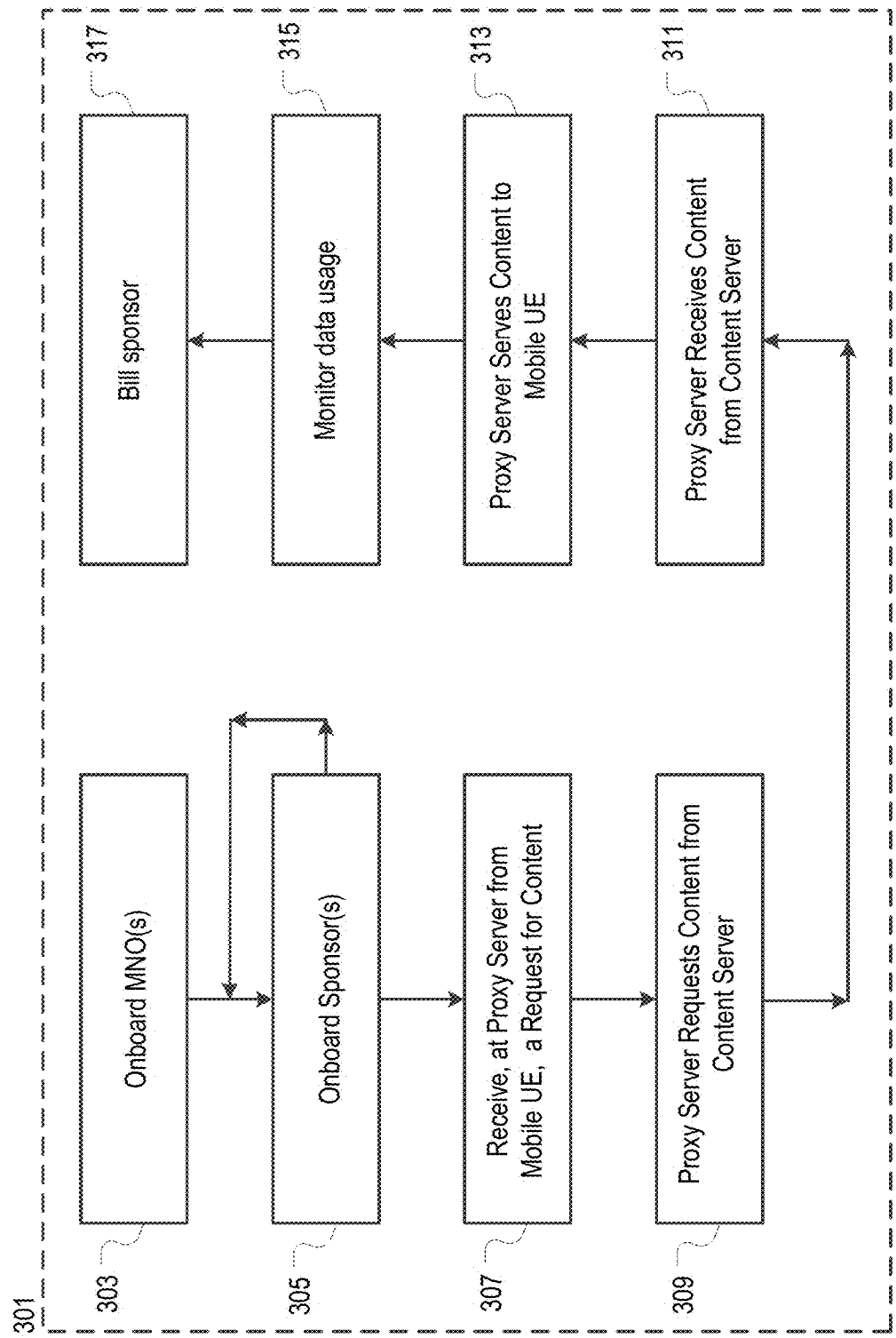

SYSTEM AND METHODS FOR ENABLING SPONSORED DATA ACCESS ACROSS MULTIPLE CARRIERS

STATEMENT OF RELATED CASES

This case claims priority of U.S. Patent Application Ser. No. 61/943,454, filed Feb. 23, 2014 and which is incorporated by reference herein.

FIELD OF THE INVENTION

This invention pertains generally to mobile networks and more particularly to accessing data via a mobile network.

BACKGROUND OF THE INVENTION

Data access in a mobile network is unique in the world in that the operator charges the subscriber per access and by quantity. To that end, a Mobile Network Operator (MNO) keeps a detailed subscriber record in its database. Those records are used to control a mobile subscriber's ability to access the mobile network and the capabilities available to the user when using the mobile network. For example, subscriber account information can be used to determine if the subscriber can access the mobile network and at what usage level.

In the current mobile model, all data received and sent by a mobile device user is tracked by the MNO and charged against a pre-agreed data plan. This could be a post-paid plan as is most common in the United States or a prepaid type plan where mobile users pay up-front for a block of data. Once the allowance or quota is used, the mobile user has to pay for the extra amount on their monthly bill or "top up" their phone in the prepaid model if they want to continue using data services.

Subscribers tend to watch their mobile data usage to avoid charges either by forgoing data usage altogether or by seeking out WiFi networks where a free or flat-rate charge will cover all the data they need to consume. As a consequence, the MNO's network is underutilized and its potential revenue is reduced. In order to resolve this, the operators need to create a solution that will attract more subscribers and still allow for premium revenue, thus combating the trend towards using WiFi instead.

One such solution to this problem is for the MNO to ask the source of the data to pay for the subscriber's data. This approach is termed "Sponsored Data," wherein instead of the MNO charging the subscriber (e.g., consumer, business person, etc.) for their data usage, some or all of their data is paid for by some entity other than the end consumer; that is, the entity that is the source of the data being accessed. This is advantageous for all involved:

- the subscriber saves money;
- the sponsoring entity attracts more customers to its web site, presumably promoting its products or services; and
- the MNO is now getting paid for data traffic on its network that, but for the sponsor paying for it, would likely not exist.

In the case of Sponsored Data, the MNO still tracks the data usage of their customers. But the data cost for accessing certain websites or services (i.e., the sponsored services) would be passed back to the sponsor of the content rather than to the mobile subscriber.

FIG. 1 depicts prior-art sponsored data service/system 100. MNO 102 provides both sponsored and non-sponsored data to its mobile subscribers (104a and 104b). The data is sourced from Entity 110 and Entity 112, as accessed via Internet Service Provider ("ISP") 108. Entity 110 has not joined sponsored data service/system 100 and, as a consequence, mobile subscribers 104a and 104b will pay for any data usage (over communications ("com") links 2 and 4 sourced from enterprise 110. Entity 112 has joined the sponsored data service 100 and, as such, will itself pay the MNO for the data usage (over com links 3 and 5) of subscriber 104b of data sourced from Entity 112.

MNO 102 must keep track of what particular data is sponsored and what data is not sponsored, such as by using "white-listed" URLs/IP addresses encoded into the MNO's packet gateway. In this context, white-listed URLs indicate participation in the sponsored data service such that data usage in conjunction with such URLs is not debited against a subscriber's account. This white-listing process must be performed for each entity that is sponsoring data and it must be performed on a per URL basis. More specifically, the white-listed URLs/IP addresses are retained by, and the data tracking is performed by Gateway GPRS Support Node (GGSN) 106. In some other embodiments, these functions are handled by the CDMA Packet Data Serving Node (PDSN), 4G Packet Gateway (PGW) element, or packet core enforcement function (PCEF), the latter of which can be in a stand-alone server or incorporated in the GGSN, PDF, or PDSN.

Consider that a single sponsoring entity could have many thousands of URLs mapping to multiple pages from multiple customers. Every such URL would have to be "white-listed" in order for such access not to be charged to the subscriber. That means encoding the many thousands of URLs in an MNO's packet gateway. This is significant hardship for an MNO.

Every time a sponsoring entity adds a new sponsored link, that link has to be white-listed in the MNO's packet gateway. So in addition to the initial (static) on-boarding white-listing burden, there is a continuing (dynamic) burden, wherein any new sponsored links must be encoded in the MNO's packet gateway. Not all networks are even capable of doing this.

The aforementioned and other drawbacks of prior-art sponsored data service 100 are summarized in Table 1, below.

| Feature | Drawback/Disadvantage |
|---|---|
| URL/IP Address Provisioning | The sponsoring entity must provide a server-side function that issues a set of white-listed URLs/IP addresses to the MNO for each subscriber for each data session. The MNO's network must be equipped with a policy server that can accept dynamic rules in order to provision URLs on the basis indicated above. |
| Server-side Functionality in Sponsor App | Sponsored data service 100 only works for a single mobile network. For data service 100 to even have a chance of working with multiple mobile networks, each such network would have to implement the sponsoring methodology the exact same way, or each entity that sponsors data must adapt their interfaces with each MNO to meet that MNO's capabilities. As a consequence, data service 100 does not scale beyond use with a single MNO, making the use thereof very challenging for entities wishing to sponsor data. |
| Sponsor Onboarding | Each sponsoring entity must be on-boarded with each mobile operator they wish to work with on a sponsored plan, which requires negotiating a separate deal with each such operator. |
| Billing | Each MNO sends a separate bill to the sponsoring entity, requiring the sponsor to settle separately with each MNO. And each entity would have to be on-boarded and |

| Feature | Drawback/Disadvantage |
| --- | --- |
| | separately provisioned into the MNO's billing system (billing ID, database, reports, record retention, audits, etc.)—a major hardship on the MNO. |

SUMMARY

The present invention provides a sponsored data service/system ("SDS") that avoids some of the drawbacks of the prior art. Unlike the prior art, the SDS is MNO-neutral and exists separate and apart from any given mobile network.

As noted above, white-listing or "zero-rating" of URLs and IP addresses is currently required to provide sponsored data. This is a primary mechanism for ensuring that subscribers are not charged for the data they consume during a sponsored data session on a mobile network. As indicated in Table 1 above, in the prior art, a sponsoring entity must provide a server-side function that issues a set of URLs/IP addresses to the MNO for each subscriber for each data session. And this must be done for each MNO that the sponsoring entity has a relationship with. It is likely that the methods required will be different for different MNOs. In other words, the prior-art solution is not scalable.

Unlike the prior art and in accordance with the illustrative embodiment of the invention, the SDS can provide MNOs and sponsoring entities with a single domain name for identifying sponsored data. During on-boarding of an MNO, the SDS provides the top-level domain (TLD) to the MNO; for example, ".TATA_SponData.com". The MNO then adds a wild-card character(s) to the TLD and encodes it into their packet gateway. The specifics of the wild card are a function of a particular MNO's system. In the following example, the "asterisk" represents the wild card: *.TATA_SponData.com.

When a sponsoring entity is on-boarded, they are provided (typically by the SDS) with a unique identifier—a label. The label (as a pre-pend) and the TLD are concatenated; for example: Mr3217.TATA_SponData.com, thus providing a fully qualified domain name (FQDN). The SDS uses the pre-pended label to track which sponsoring entity is associated with the sponsored data usage being monitored (byte counted) via its proxy server.

Importantly, the MNO does not need any information about the sponsoring entity (i.e., the MNO is "ignorant" of the pre-pend). Once the MNO sees data that has the "sponsored" domain name (the TLD), it knows that any data traffic associated with it is to be zero rated, thus insuring that all access to and from the domain (or any subdomain thereof) is not charged to the subscriber.

Thus, rather than having to encode countless thousands of addresses to be white-listed, the MNO need only encode a single sponsored domain (TLD). When the MNO's gateway sees the sponsored domain, it knows to zero-rate the traffic. And because the MNO needs to recognize only the single sponsored domain name, there is no need to update the MNO's white-list as in the prior art. On-boarding is a one time, single-entry operation.

For sponsoring entities that use HTTPs data streams or for VPNs, IP addresses are the only means of identifying the source and destination of such streams. Embodiments of the SDS provide a number of dedicated or virtual IP addresses or an entire class of IP addresses that are white-listed by the partnering MNO for such applications. In fact, even for HTTP, use of a virtual IP address (versus a URL) provides protection against hacking.

There are two basic scenarios for the SDS. In a first scenario, there is a direct, pre-existing business relationship between the MNOs and the sponsoring entities (which the MNO does not wish to alter in any fashion). In this scenario, the SDS helps the MNO settle the bill with sponsoring entity, but the SDS's presence typically remains hidden from the sponsoring entity. Embodiments of the SDS for use in the first scenario are referred to herein as "hub-based" or identified as "$SDS_h$".

In accordance with the illustrative embodiment of a hub-based SDS, the $SDS_h$ handles data-monitoring (byte counting). To accomplish this data-monitoring functionality, sponsored data traffic passes through the $SDS_h$. The $SDS_h$ tracks the usage of sponsored data and prepares a bill that the MNO will send to the sponsoring entity. Typically, the bill appears on the MNO's own billing stationary. The MNO then bills the sponsoring entity. The $SDS_h$ charges a fee to the MNO for this service. The MNO sets rates for the sponsoring entities. The $SDS_h$ provides the following core functionality:

- MNOs and sponsoring entities are on-boarded to the $SDS_h$;
- a single, common domain name is provided to all MNOs for whitelisting;
- for HTTPs, IP addresses are provided for white-listing;
- sponsored data traffic passes through the $SDS_h$ network for monitoring; and
- a bill is prepared for the MNO to deliver to the sponsoring entity.

In the second scenario, in which there is often no pre-existing business relationship between an MNO and sponsoring entities (or if there is, the MNO is willing to alter it), the SDS functions as a full service exchange. In such embodiments, referred to herein as "hub and exchange-based" or identified as "$SDS_{h.e.}$", the system provides the following core functionality:

- MNOs and sponsoring entities are on-boarded to the $SDS_{h.e.}$;
- a single, common domain name is provided to all MNOs for whitelisting;
- for HTTPs, IP addresses are provided for white-listing;
- sponsored data traffic passes through the $SDS_{h.e.}$ network for monitoring;
- data rates are negotiated with MNOs and provided to the sponsoring entities;
- MNO bills the $SDS_{h.e.}$ for sponsored data usage in its network at the negotiated (wholesale) rates; and
- the $SDS_{h.e.}$ bills sponsoring entities for sponsored data usage based on data counts from monitoring performed by the $SDS_{h.e.}$.

In some embodiments, the service provided by the SDS is established via registration. Registration may be accomplished, for example, via intelligence (an "App") placed in a phone, tablet, pad, etc. (hereinafter simply "phone") provided by the sponsoring entity, or when a subscriber visits the sponsoring entity's web site. The subscriber can be, for example, an individual or an entity that wants to enable certain things for its employees, etc.

After registration is complete, the subscriber's phone will be permitted access to data associated with the whitelisted domain name, at the discretion of the sponsoring entity. This "free" URL (or virtual IP address range) is kept in the MNO's internet packet gateway as a white-listed URL, as previously discussed. This single static entry serves for all subscribers and all URLs having the whitelisted domain name, as opposed to requiring thousands of unique dynamic entries per subscriber.

The phone App or browser that is used to access the free URL will be routed to the $SDS_{h.e.}$. Using the information extracted from the phone App or browser, the SDS can permit access to the sponsored data and track its utilization.

On a periodic basis, the operator of the $SDS_{h.e.}$ pays the MNO for the sponsored data tracked through the $SDS_{h.e.}$ and reconciles billing records with the MNO to ensure that there is no fraud or mischarges.

A benefit of this sponsored data service is that the MNO always gets paid for the sponsored data usage. And, most importantly, on-boarding of the MNO is a one time, single-entity operation. It is not a complex process that requires entries for hundreds or thousands of potential sponsoring entities, nor does it require any updates.

In addition, the SDS can apply policy services to the traffic being consumed on behalf of the MNO or the sponsoring entity. The policy can pertain, for example and without limitation, to one or more of the following:
 Customer standing (new, established, premium, etc.)
 Customer Location (country, state, town, street corner, etc.)
 Time of Day (happy hours, off-hours, busy hours, scheduled, etc.)
 Network Conditions (congested, open, etc.)
 Content type (video, text, applications, porn, business content, etc.)
 Customer age/Parental controls
 Operator Network (MNO A vs. MNO B)
 Existing Quality of Service or Quality of Experience (from subscriber's view)
 Network type (WiFi, Wireline, Mobile, 3G, 4G)

It is notable that, unlike the prior art, a wireless user who does not have a data plan can be given access to sponsored data.

In some embodiments, the sponsored data service can work with advertisers who wish to sponsor various data content. Thus, an advertiser can underwrite some or all of the cost of the sponsored data for the sponsoring entity. Sponsorship can also depend on many of the aforementioned parameters.

Embodiments of the present invention can be used in situations when there are:
 multiple mobile operator networks; and/or
 multiple sponsors per ISP; and/or
 multiple content providers per sponsor; and/or
 multiple content providers across multiple ISPs for a single sponsor; and/or
 sponsor(s) directing locally cached content to be inserted; and/or
 sponsor(s) directing remotely cached content to be inserted.

BRIEF DESCRIPTION OF THE DRAWINGS

FIG. 3B depicts a method for operating the system of FIG. 3A.

DETAILED DESCRIPTION

Figure 1:
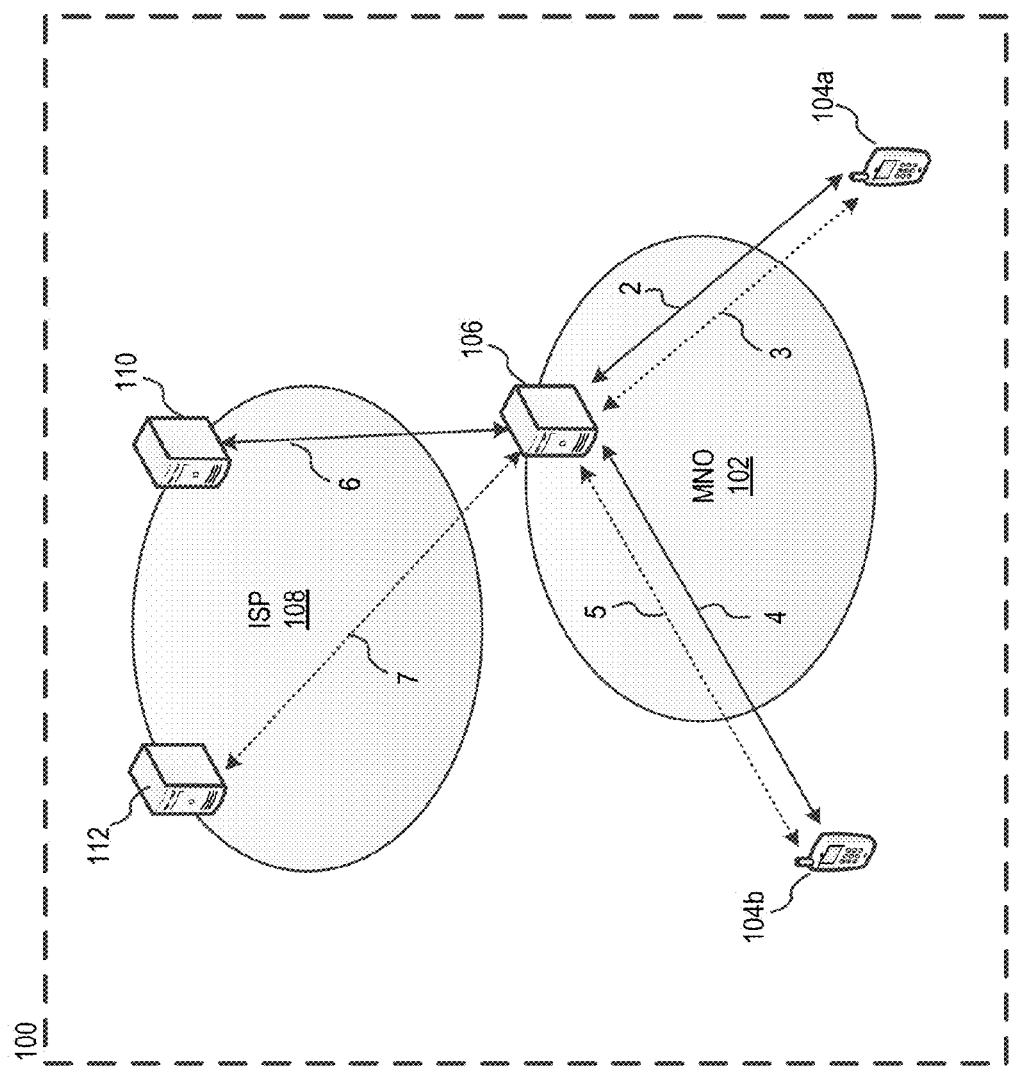
FIG. 1 depicts a sponsored data service in the prior art.

The term "sponsor" is explicitly defined for use herein and in the appended claims to mean: an entity associated with sponsored data, which can be, without limitation, an enterprise, an enterprise offering split billing to its employees, a third party, such as an advertiser, an Ad network, or a collection of destinations. Typically, a sponsor is any entity that pays for at least some of the cost of sponsored data. Yet, the sponsor might not offer any content at all.

The term "sponsored data" is explicitly defined for use herein and in the appended claims to mean: data usage by a mobile subscriber that is not charged to the subscriber's mobile data plan.

The various embodiments of the sponsored data service/system (SDS) all provide at least several functions from a basic suite thereof. This suite of functions is presented below and briefly discussed.
 Asset Management: The "assets" are the URL(s) and IP addresses that are used to identify sponsored data. They need to be securely managed internally, in known fashion, and then provided to an MNO for white-listing when they are on-boarded to the system. In the illustrative embodiment, the SDS will use a single domain name, although optionally, additional sponsored-data domains names can be used.
 MNO Onboarding: Initial contact information, qualification analysis, service parameters, and a verification of the sponsor list and content with MNO. Once the information is gathered, certain preliminary functions are performed depending on whether there are existing Sponsor relationships with the MNO or SDS. These functions include, among any other tasks, whitelisting.
 Sponsor Onboarding: SDS receives at least some of the following information from the sponsor: a) contact list, b) list of MNOs they want or do not want to do business with, c) a description of content type. SDS provides the sponsored data TLD or IP address to the sponsor with a unique identifier that is then pre-pended to the TLD.
 Data Monitoring: The MNO begins monitoring a mobile subscriber's activity as soon as the subscriber launches a mobile app or clicks on a link to request access to sponsored content. The MNO counts data usage for sponsored as well as un-sponsored content. The SDS counts data usage for all sponsored content. All content that falls within the address range provided by the SDS that corresponds to the sponsored URL(s) or IP addresses in the whitelist will be zero-rated. In other words, it will be counted and reported, but not charged to the subscriber.

When a mobile subscriber has been approved with a sponsor, monitoring of that subscriber's activities on the specified sponsored URL or IP address begins. The SDS receives all of the sponsored data traffic to and from the subscriber. The mobile app or browser web page on the subscriber's phone will be instructed to communicate with a URL (or IP address) internal to the SDS. The URL or IP address acts as a proxy (or CDN) for the final destination at the sponsor. This enables the monitoring function at SDS to see all sponsored traffic and monitor the data sent to and from the mobile subscriber.

Billing Settlement: In hub-based embodiments, the SDS monitors the usage of data and helps the MNO prepare a bill that the MNO ultimately sends to the sponsor. The SDS bills the MNO for its data monitoring and billing service. In hub-exchange based embodiments, the MNO will bill the SDS based on negotiated rates and the MNO's byte count (reconciled with the SDS's own byte count), and the SDS bills sponsors based on SDS's byte counts at its negotiated rates.

As previously noted, in some embodiments, the service provided by the SDS is established via registration. Registration may be accomplished, for example, via intelligence placed in a phone application ("App") provided by the sponsor, or when a subscriber visits the sponsor's web site. After registration is complete, the subscriber's phone will be permitted access to certain "free" URLs on the Internet, as sponsored by that sponsor. The service involves a number of tasks, such as acquiring the App user onboarding, user authentication, determination of sponsor offerings, etc. The end-to-end method for accessing sponsored data is discussed later in this disclosure in conjunction with FIG. 8 after a number of embodiments of the SDS are presented.

Figure 2:
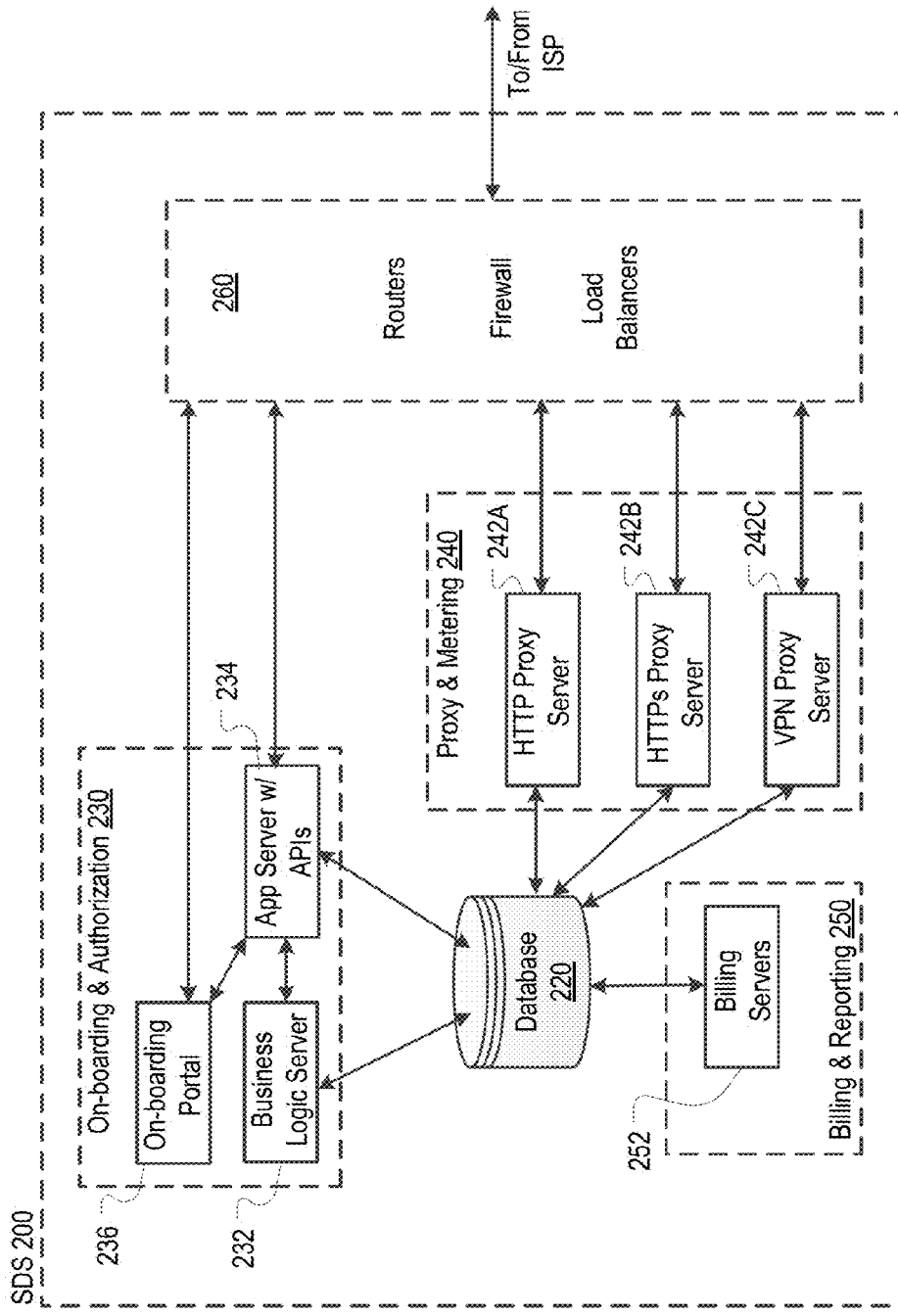
FIG. 2 depicts an architecture for a sponsored data service/system in accordance with the present teachings.

FIG. 2 depicts an illustrative embodiment of the SDS in accordance with the illustrative embodiment of the present invention. FIG. 2 depicts the equipment/functionality required of the SDS. In the figures that follow, which show various embodiments of an SDS, only the pertinent functionality of the SDS will be depicted.

As depicted in FIG. 2, SDS 200 includes database 220, on-boarding & authorization subsystem 230, proxy server and data metering subsystem 240, billing & reporting subsystem 250, and various routers, load balancers, a firewall, on other equipment/functionality for interfacing with other networks (e.g., ISPs, MNOs, etc.) shown collectively as subsystem 260.

In light of the present disclosure, those skilled in the art will be familiar the various subsystems composing SDS 200 and the functioning thereof. As a consequence, such subsystems will be discussed only briefly.

Database 220 is populated with information concerning the sponsors and MNOs (e.g., sponsor IDs, sponsor billing address, contact names, call detail records/session detail records, content source URLs, and the like.

On-boarding & authorization subsystem 230 includes business logic server 232, App server w/APIs 234, and on-boarding portal 236. Business logic server 232 provides any business logic and decision making processes that are implemented (e.g., rules engines for sponsorship approval, etc.). App server w/APIs 234 is a set of web applications and APIs that are available to MNOs and sponsors for automated reading/writing data (e.g., reading rate tables, requesting reports, etc.). Among other tasks, business logic server 232 and App server 234 (which can be combined into a single server) provide the domain name (e.g., ".TATA_SponData.com" to MNO(s) that are partnering with SDS 200. For a sponsor, a sponsor identifier is provided, which is concatenated (as a pre-pended) to the domain name, thereby generating a fully qualified domain name (FQDN). On-boarding portal 236 can be, for example, an interactive web site that MNOs and sponsors use to on-board to SDS 200.

Proxy & Metering subsystem 240 comprises a proxy server that receives the sponsored content from a source thereof and delivers it to a subscriber. The proxy server includes a byte counting function to keep track of the amount of data passing through it. FIG. 2 depicts three different types of proxy servers: HTTP proxy server 242A, HTTPs proxy server 242B, and VPN proxy server 242C. HTTP proxy server 242A handles proxying and byte counting for HTTP session, HTTPs proxy server 242B handles proxying and byte counting for HTTPs sessions, and VPN proxy server 242C handles proxying and byte counting for VPN sessions. It will be understood that while SDS 200 might include multiple proxy servers of the same type, in some embodiments, all three of the proxy servers referenced might be present in SDS 200 depending on the type of service provided to the MNO.

Billing & reporting subsystem 250 includes billing servers 252. The billing servers receive information concerning the amount of sponsored data consumed by one or more sponsors and prepares invoices based on that consumption. The billing servers also deal with MNO payments, mediation, reporting, etc. As discussed later in this specification, the bill can be sent to the MNO or can be sent directly to the sponsors, depending on the embodiment.

Subsystem 260 includes routers, load balancers, a firewall, and other functionality required for interfacing with other networks, such as ISPs or MNOs.

Figure 2A:
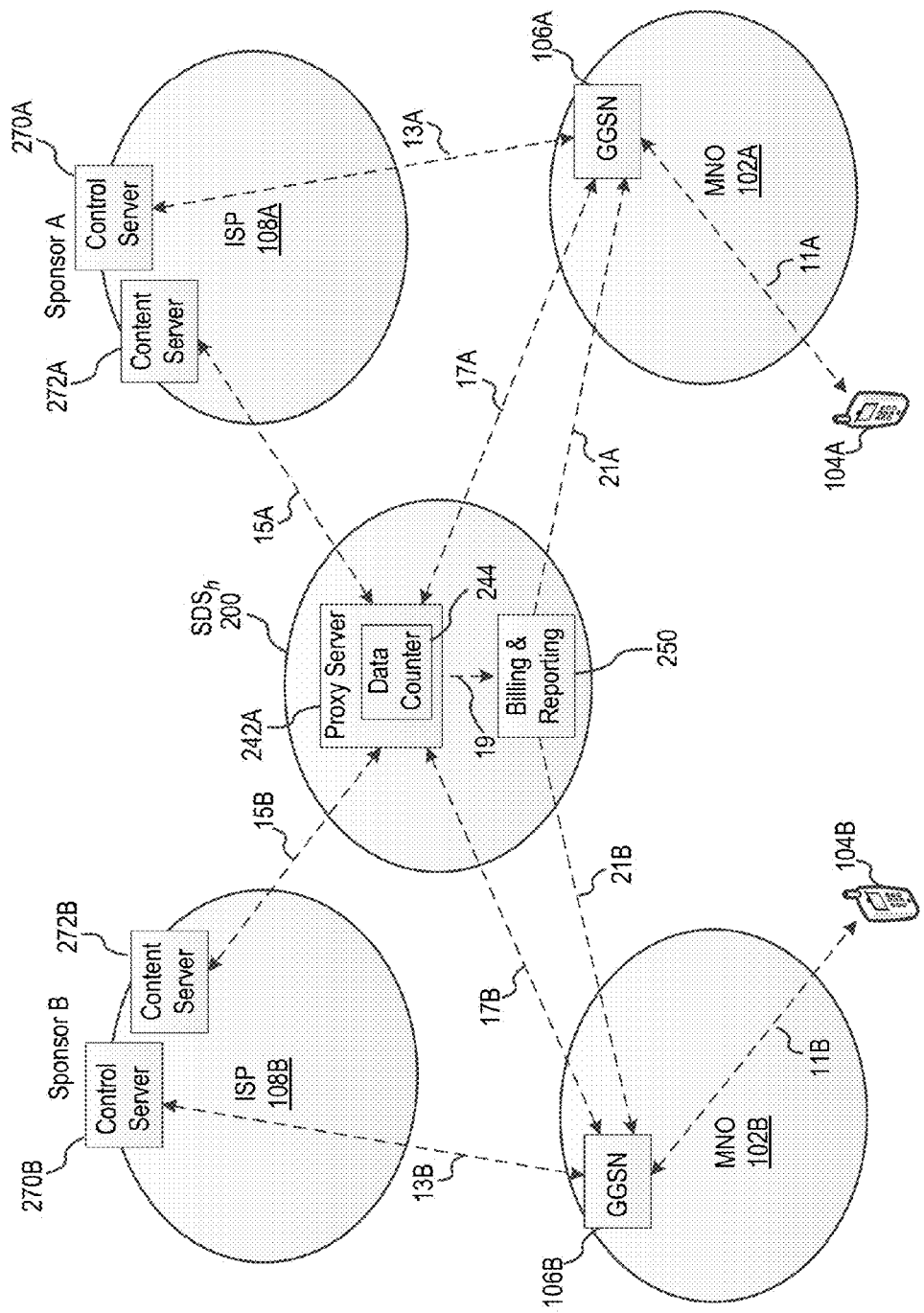
FIG. 2A depicts an embodiment of a sponsored data service/system in accordance with the present teachings.

FIG. 2A depicts a hub-based sponsored data service/system $SDS_h$ 200 in accordance with the present teachings. In this embodiment, $SDS_h$ 200 provides onboarding of MNOs and Sponsors, monitoring (byte counting) of sponsored data sessions, and billing services. With regard to the billing services, $SDS_h$ 200 prepares a bill for the MNO that the MNO then sends to the sponsor. As previously discussed, the bill will be prepared on the MNOs stationary and the presence of $SDS_h$ 200 can remain "hidden" from the sponsor(s). In some embodiments, $SDS_h$ can "police" access and can redirect or refuse access to sponsored data based on various rules/criteria.

In FIG. 2A, $SDS_h$ 200 is depicted as being used in conjunction with two MNOs 102A and 102B, two ISPs 108A and 108B, and two sponsors A and B, each represented by content/control servers 212 and 214, accessible via one or the other of the ISPs. It is to be understood that $SDS_h$ 200 can, more generally, be used in conjunction with one or more MNOs, each telecommunicating with one or more ISPs, each of which ISPs provide access to one or more sponsors. In fact, each of such sponsors can be associated with plural content providers. This is true, as well, for all embodiments of $SDS_h$ and $SDS_{h.e.}$ discussed herein.

The flow of information (e.g., requests, control, sponsored data, etc.) is identified in this embodiment, and for all other embodiments, via telecommunication links (hereinafter "com links"), which appear as "dashed" lines. It is to be understood that the com links can represent any number of physical/logical channels and are merely intended to be indicative of a flow of one or more types of information between locations. It is to be understood that the subscribers can access both sponsored and unsponsored data via the SDS, but to maintain focus on what is germane to the invention, access to sponsored data only is discussed.

Figure 2B:
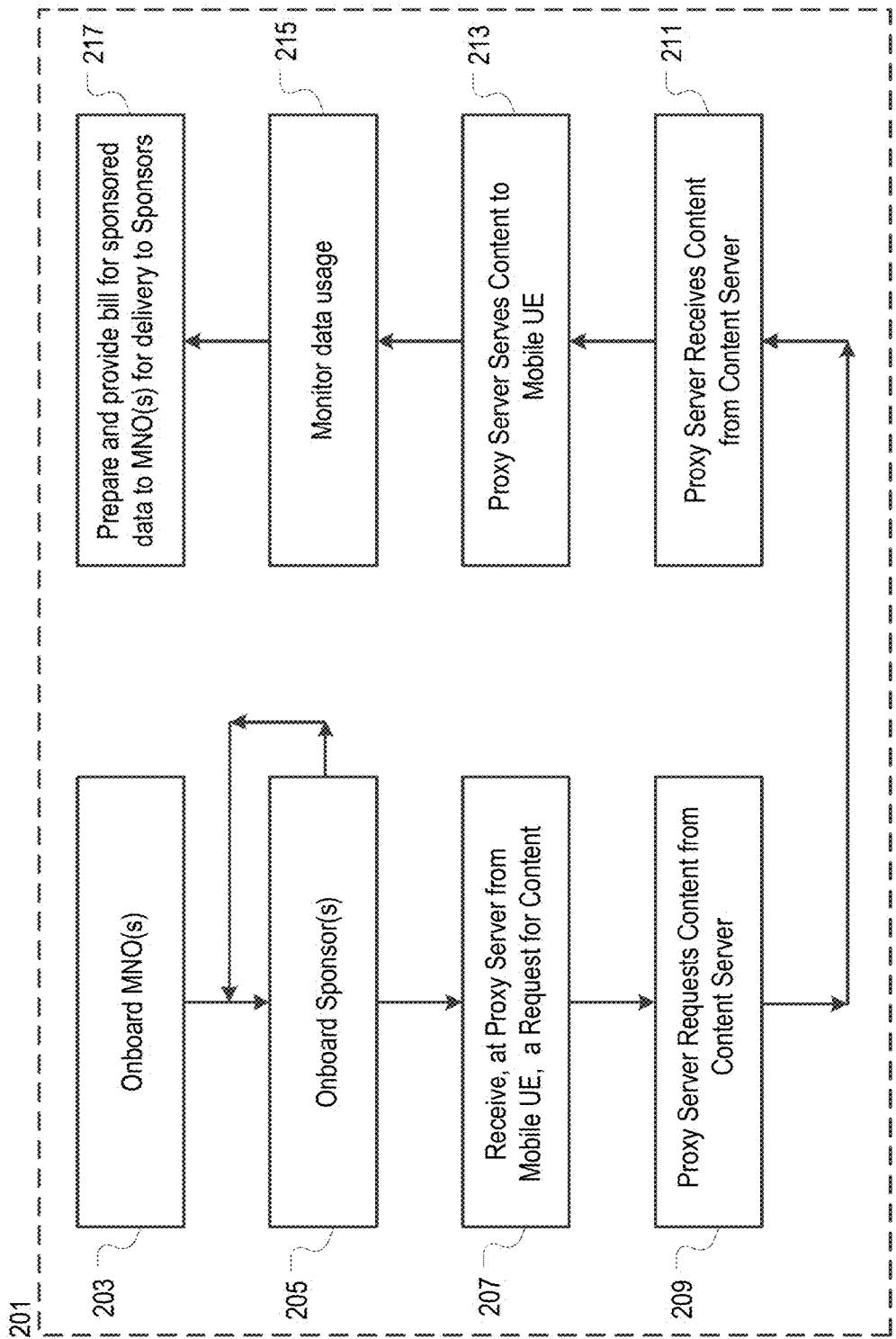
FIG. 2B depicts a method for operating the system of FIG. 2A.

FIG. 2B depicts method 201 for operating $SDS_h$ 200. Before any of the activity depicted in FIG. 2A can occur, both sponsors and MNOs must be on-boarded, per operations 203 and 205. The on-boarding process involves a number of activities that will be familiar to those skilled in the art (exchange of certain information, etc.). What is unique, and germane to hub-based embodiments of the invention, is that for MNO on-boarding (task 203), in some embodiments:

$SDS_h$ 200 provides a single domain name (TLD) for the white-listing;

The MNO enters a wild-carded version of the single domain name into its white-list.

For sponsor on-boarding (task 205), in some embodiments:

$SDS_h$ 200 provides to the sponsor a "sponsor ID"—a label, that is concatenated, as a pre-pended, to the domain name.

As indicated by the arrows associate with task 205, a very advantageous feature of the embodiments of the invention is that additional sponsors can be on-boarded without having to update the MNO's white-list. That is, MNO on-boarding and white-listing of the sponsored domain can be a one-time process, even if additional sponsors are added or new links are added by a sponsor. This is not possible in prior-art solutions.

$SDS_h$ 200 possesses most if not all of the equipment/functional elements depicted in FIG. 2. However, as previously noted, to keep the focus of the disclosure on what is germane to the invention, FIG. 2 depicts the $SDS_h$ 200 as including proxy server 242A having data counter 244.

Referring now to FIGS. 2A and 2B, access to sponsored data in the context of this embodiment occurs as follows.

Subscriber 104A makes a request to control server 270A, over com links 11A and 13A, for sponsored data. In some embodiments, the request is byte-counted by MNO 102A and will be charged against the subscriber's data plan. In some other embodiments, the request itself is sponsored and is not charged against the subscriber.

Assuming the request is granted, control server 270A returns, to subscriber 104A over com links 13A and 11A, a redirect to proxy server 242A in $SDS_h$ 200. In some embodiments, this response is byte counted by MNO 102A and will be charged against the mobile subscriber's data plan; in some other embodiments, the response is not charged against the subscriber.

Subscriber makes request for sponsored content to proxy server 242A over com links 11A, 17A (see task 207). This request is zero rated by MNO and byte counted by data counter 244 in the proxy server. At task 209, proxy server 242A makes a request for content to content Server 272A over com link 15A. Per task 211, content server 272A returns content to proxy server 242A over com link 15A. The proxy server then serves the sponsored content to subscriber 104A over com links 17A and 11A, per task 213.

Data usage is monitored (byte counted) in data counter 244 in accordance with task 215. The sponsored content is zero rated by MNO 102A so there is no charge to subscriber 104A. It will be appreciated that data monitoring, per task 215, occurs as content is being served; that is, no order of tasks is implied by the relative reference numerals of the tasks (i.e., 213 versus 215). This is true for all the following embodiments as well.

In accordance with task 217, billing and reporting subsystem 250 of $SDS_h$ 200 prepares an invoice for MNO 102A reflecting usage of sponsored data and transmits it, over com link 21A, to GGSN 106A in MNO 102A. The bill is typically prepared on the MNO's billing stationary and is then sent from MNO 102A to Sponsor A.

$SDS_h$ 200 interacts with subscriber 104B, MNO 102B, ISP 108B, and sponsor B in the same fashion as discussed above with respect to subscriber 104A, MNO 102A, ISP 108A, and sponsor A to provide subscriber 104B with access to sponsored data.

Figure 3A:
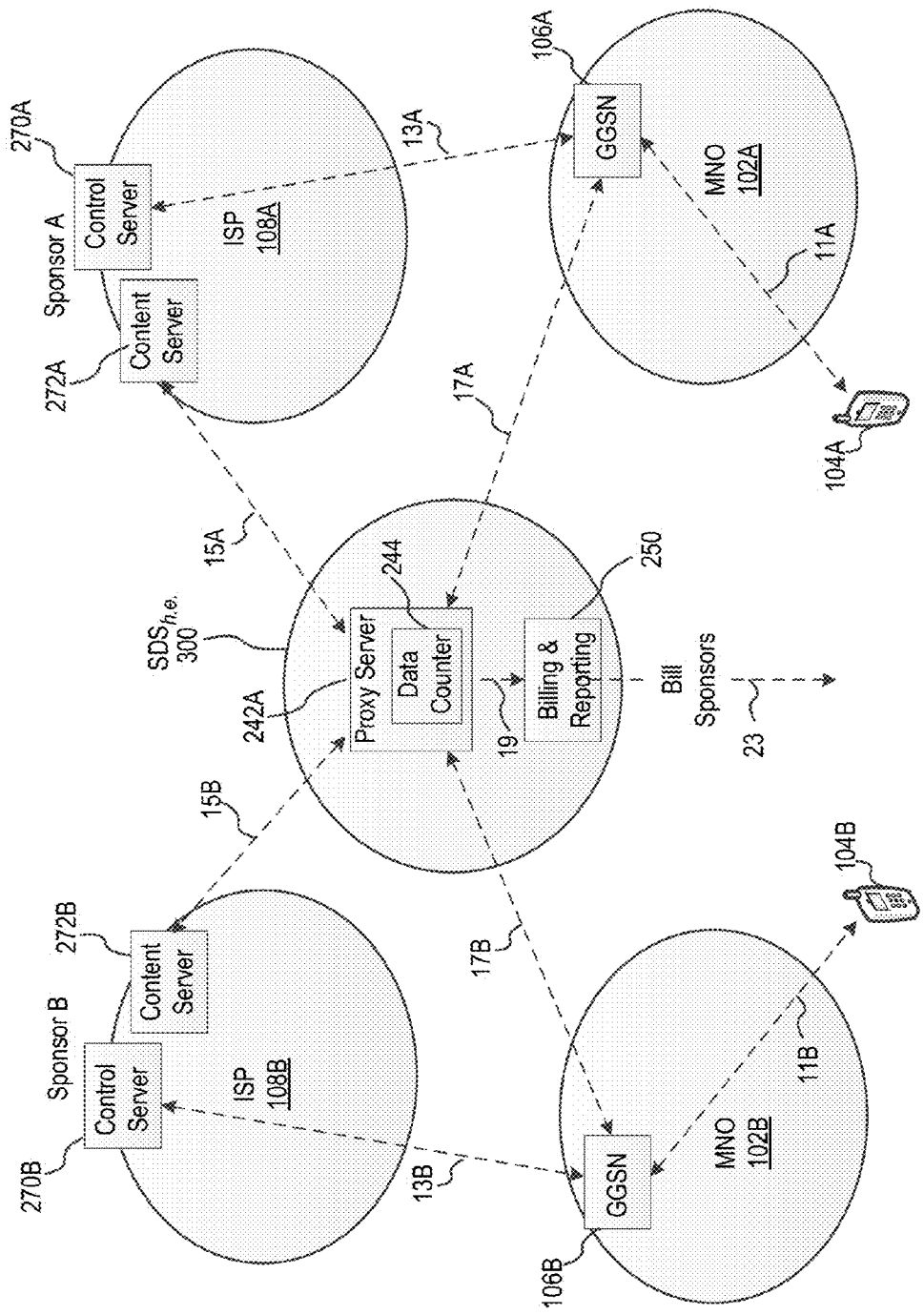
FIG. 3A depicts an embodiment of a sponsored data service/system in accordance with the present teachings.

FIG. 3A depicts a hub-and-exchange based sponsored data service/system $SDS_{h.e.}$ 300 in accordance with the present teachings. FIG. 3B depicts method 301 for operating $SDS_{h.e.}$ 300. Although the architecture of $SDS_{h.e.}$ 300 (and that of other embodiments of $SDS_{h.e.}$ depicted later in this specification) is mostly the same as that of the illustrative embodiment of $SDS_h$, the mode of operation is somewhat different. Chief among such differences is that in embodiments of the $SDS_{h.e.}$, the operator of the $SDS_{h.e.}$ negotiates with the MNO(s) for the data usage and then charges the sponsors directly at rates that the $SDS_{h.e.}$ negotiates with the sponsors. In contrast, the $SDS_h$ does not purchase data from the MNO nor (typically) charge the sponsor directly. Rather, the sponsor is charged at the rates agreed to with the MNO and the $SDS_h$ charges the MNO a fee for its services.

In FIG. 3A, $SDS_{h.e.}$ 300 is used in conjunction with two MNOs 102A and 102B, two ISPs 108A and 108B, and two sponsors A and B. Sponsor A has control server 270A and content server 272A. Sponsor B has control server 270B and content server 272B. Access to the information of sponsor A is via ISP 108A and access to the information of sponsor B is via ISP 108B.

Referring now to FIGS. 3A and 3B, as per method 301, $SDS_{h.e.}$ 300 on-boards MNOs at task 303 and Sponsors at task 305, to the extent this has not been performed. In addition to the tasks performed during on-boarding for hub-based embodiments (i.e., $SDS_h$ 200), for MNO on-boarding, the SDS enters into a "wholesale" data arrangement with the MNO wherein it purchases data from the MNO. And for sponsor on-boarding, the SDS and sponsor agree on a rate at which the SDS will charge the sponsor for the sponsored data.

Access to sponsored data in the context of this embodiment occurs as follows.

Subscriber 104A makes a request to control server 270A, over com links 11A and 13A, for sponsored data. In some embodiments, the request is byte-counted by MNO 102A and will be charged against the subscriber's data plan. In some other embodiments, the request itself is sponsored and is not charged against the subscriber.

Assuming the request is granted, control server 270A returns, to subscriber 104A over com links 13A and 11A, a redirect to proxy server 242A in $SDS_{h.e.}$ 300. In some embodiments, this response is byte counted by MNO 102A and will be charged against the mobile subscriber's data plan; in some other embodiments, the response is not charged against the subscriber.

Subscriber makes request for sponsored content to proxy server 242A over com links 11A, 17A (see task 207). This request is zero rated by MNO and byte counted by data counter 244 in the proxy server. At task 209, proxy server 242A makes a request for content to content server 272A over com link 15A. Per task 211, content server 272A returns content to proxy server 242A over com link 15A. The proxy server then serves the sponsored content to subscriber 104A over com links 17A and 11A, per task 213.

Data usage is monitored (byte counted) in data counter 244 in accordance with task 215. The sponsored content is zero rated by MNO 102A so there is no charge to subscriber 104A.

Data usage is reported to billing and reporting subsystem 250 over com link 19. A bill is prepared by $SDS_{h.e.}$ 300 for the amount of sponsored data usage and sent directly to sponsor A over com link 23 (see task 217). Invoicing will occur on some periodic (e.g., monthly, etc.) basis.

$SDS_{h.e.}$ 300 interacts with subscriber 104B, MNO 102B, ISP 108B, and sponsor B in the same fashion as discussed above with respect to subscriber 104A, MNO 102A, ISP 108A, and sponsor A to provide subscriber 104B with access to sponsored data.

Figure 4:
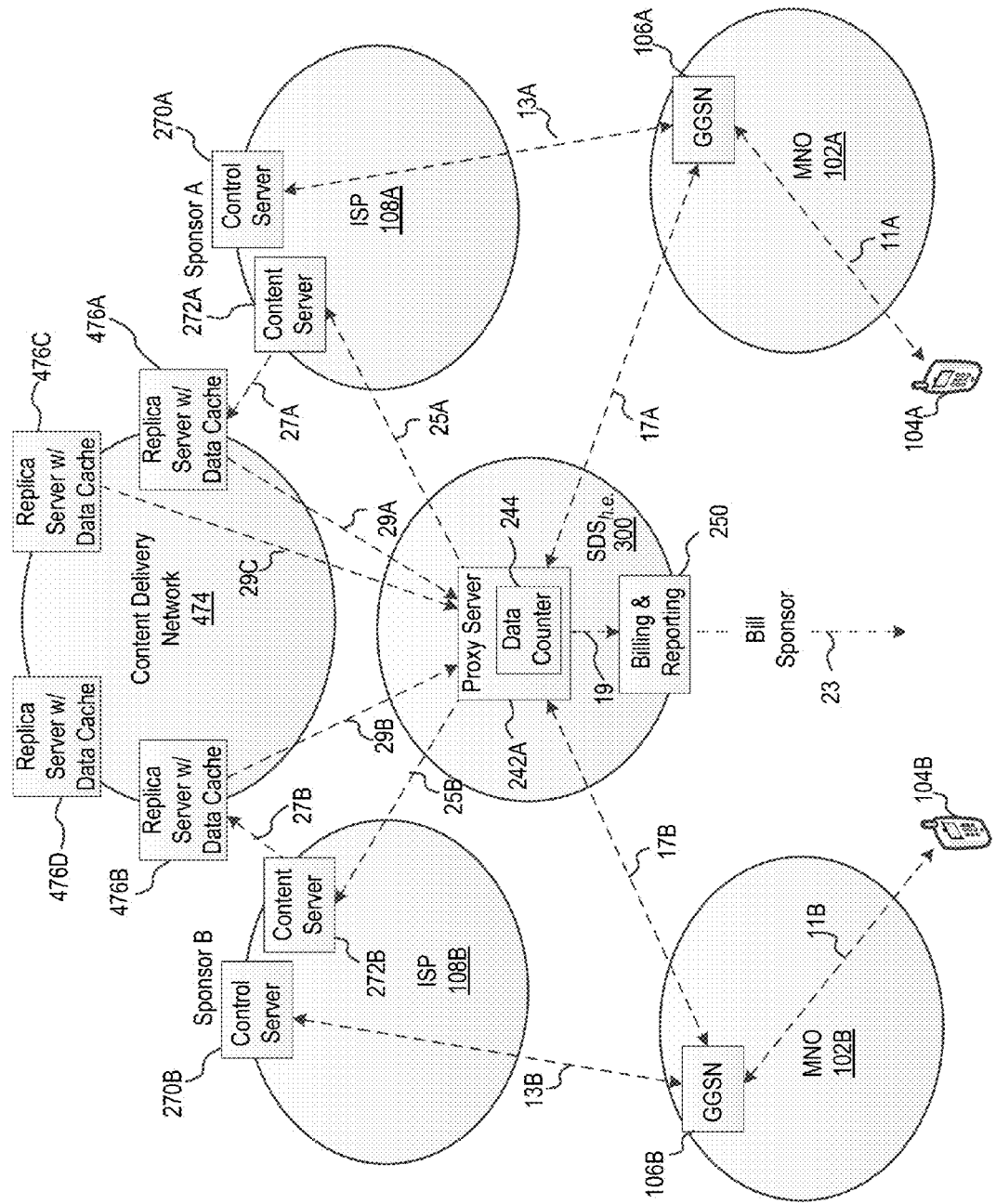
FIG. 4 depicts an embodiment of a sponsored data service/system in accordance with the present teachings.

FIG. 4 depicts $SDS_{h.e.}$ 300 accessing sponsored content from a distributed content delivery network.

In FIG. 4, $SDS_{h.e.}$ 300 is used in conjunction with two MNOs 102A and 102B, two ISPs 108A and 108B, two sponsors A (control server 270A and content server 272A) and B (control server 270B and content server 272B), and content delivery network ("CDN") 474. This CDN is a conventional content delivery network comprising a large distributed system of content servers deployed in multiple data centers across the Internet.

CDN 474 includes a plurality of replica servers, four of which (i.e., 476A through 476D) are depicted in FIG. 4.

The method by which sponsored data is obtained is similar to that depicted in FIG. 3B. However, rather than proxy server 242A receiving content from content server 272A, it receives it from replica server 476A over com link 29A, after the replica server receives the content from content server 272A over com link 27A (if the replica server does not have the content in its data cache).

Replica server 476C is also depicted as providing content to proxy server 242A (over com link 29C). This is simply to illustrate that the content may be provided from multiple replica servers.

$SDS_{h.e.}$ 300 interacts with subscriber 104B, MNO 102B, ISP 108B, sponsor B, and CDN 474 in the same fashion as discussed above with respect to subscriber 104A, MNO 102A, ISP 108A, and sponsor A to provide subscriber 104B with access to sponsored data.

Figure 5A:
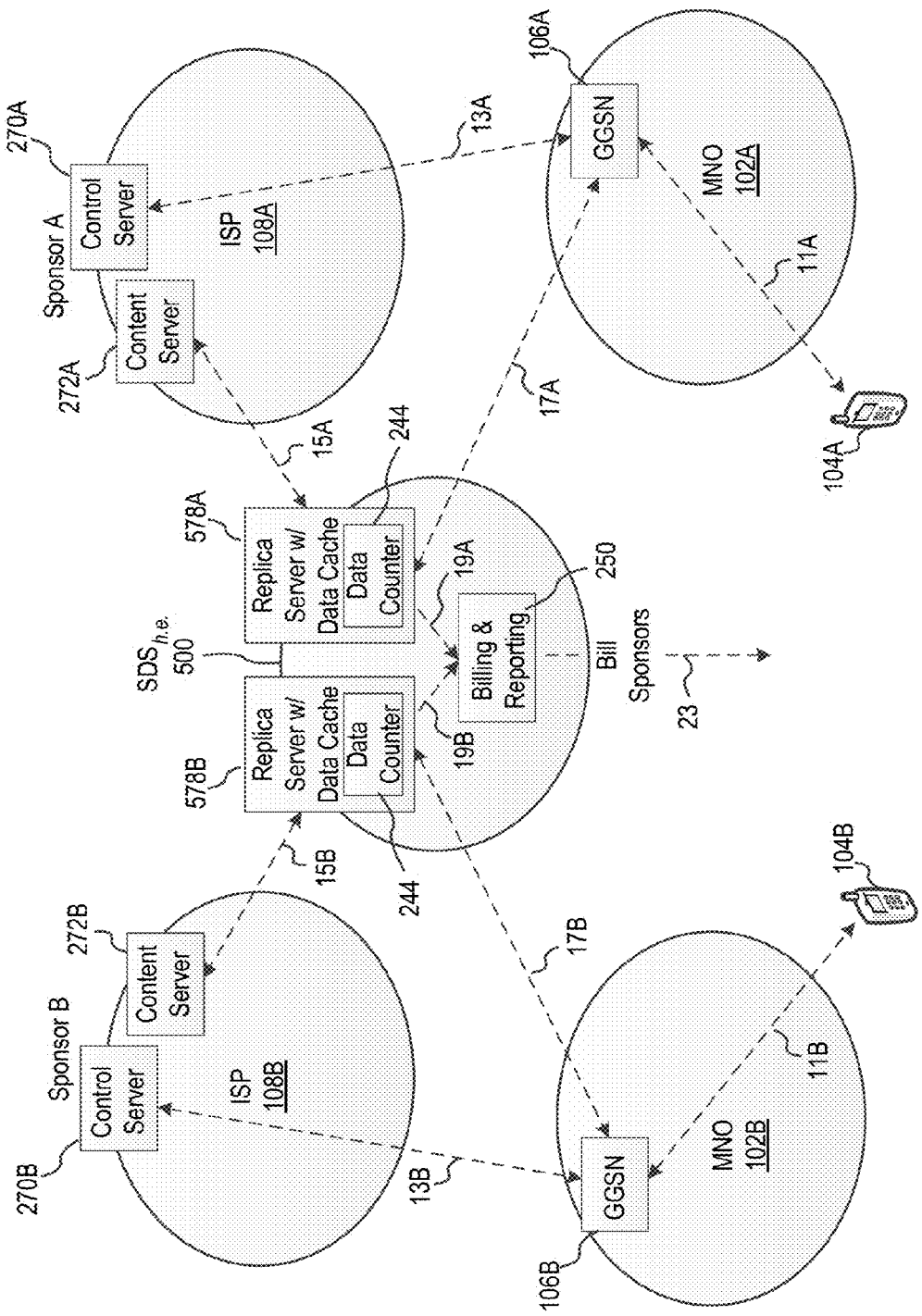
FIG. 5A depicts an embodiment of a sponsored data service/system in accordance with the present teachings.

FIG. 5A depicts a further embodiment of a hub-and-exchange sponsored data service/system $SDS_{h.e.}$ 500 in accordance with the present teachings. In addition to providing the functionality of $SDS_{h.e.}$ 300, $SDS_{h.e.}$ 500 itself functions as a CDN. In some alternative embodiments, the requisite monitoring (e.g., byte counting, etc.) equipment for a SDS is installed in a third party CDN that partners with the operator of the sponsored data service/system.

Figure 5B:
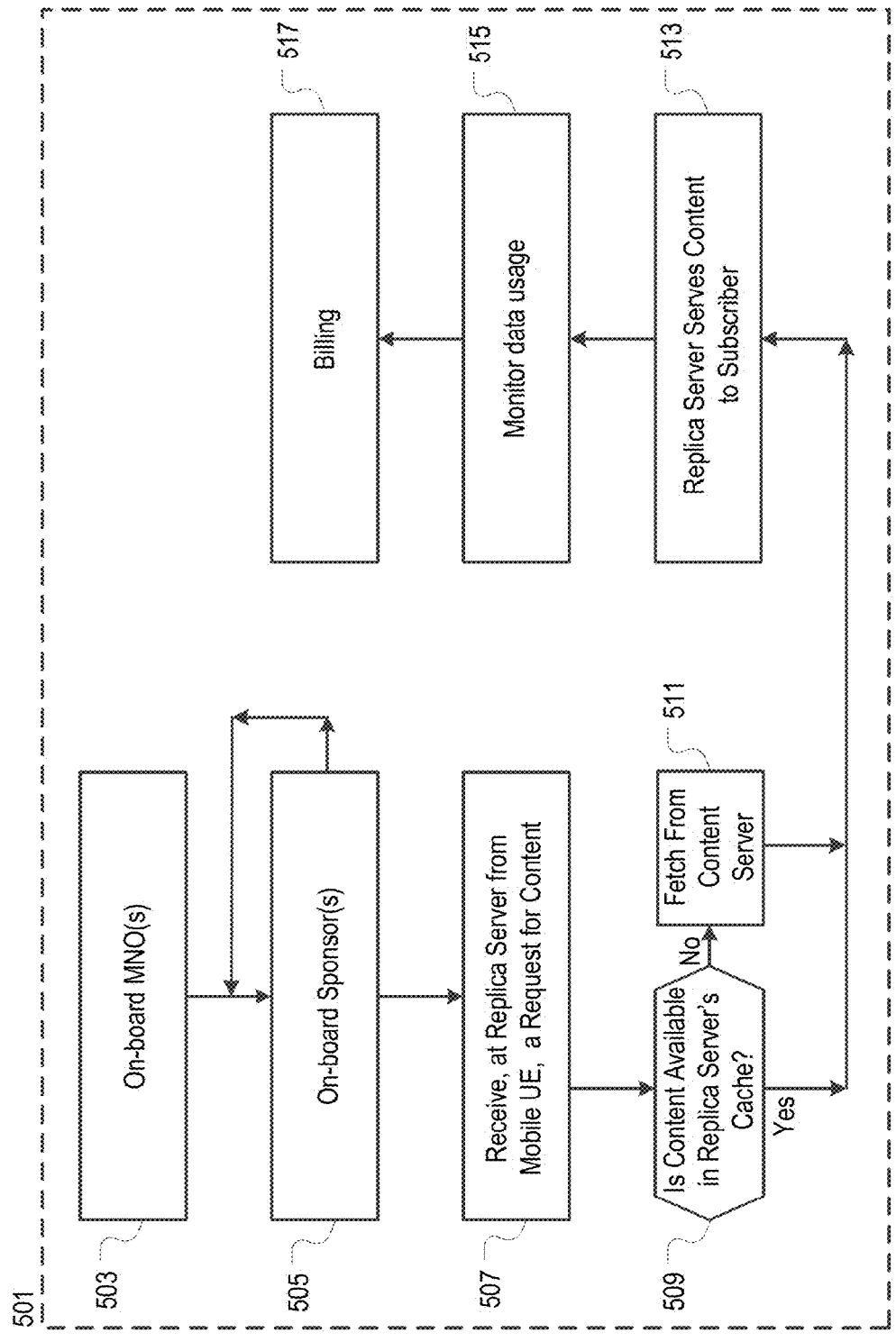
FIG. 5B depicts a method for operating the system of FIG. 5A.

FIG. 5B depicts method 501 for operating $SDS_{h.e.}$ 500. As is typical for embodiments of the invention, $SDS_{h.e.}$ 500 provides onboarding of MNOs and Sponsors, monitoring (byte counting) of sponsored data sessions, and billing services.

In FIG. 5A, $SDS_{h.e.}$ 500 is used in conjunction with two MNOs 102A and 102B, two ISPs 108A and 108B, two sponsors A (control server 270A and content server 272A) and B (control server 270B and content server 272B). As previously indicated, in addition to providing the functionality of $SDS_{h.e.}$ 300, $SDS_{h.e.}$ 500 functions as a content delivery network in this embodiment.

Referring now to FIGS. 5A and 5B, as per method 501, $SDS_{h.e.}$ 500 on-boards MNOs at task 503 and Sponsors at task 505 to the extent this has not been performed. Access to sponsored data in the context of this embodiment occurs as follows.

Mobile subscriber makes a request to control server 270A, over com links 11A and 13A, for sponsored data. In some embodiments, the request is byte-counted by MNO 102A and will be charged against the subscriber's data plan. In some other embodiments, the request itself is sponsored and is not charged against the subscriber.

Assuming the request is granted, control server 270A returns, to subscriber 104A over com links 13A and 11A, a redirect to replica server 578A in $SDS_{h.e.}$ 500. In some embodiments, this response is byte counted by MNO 102A and will be charged against the mobile subscriber's data plan; in some other embodiments, the response is not charged against the subscriber.

Subscriber 104A makes request for sponsored content to Replica Server 578A over com links 11A and 17A (see task 507). This request is zero rated by MNO and byte counted by data counter 244 in replica server 578A. Query, at task 509, whether the sponsored content is available in the cache of replica server 578A. If not, at task 511, replica server 578A fetches the sponsored content from content server 272A over com link 15A.

At task 513, replica server 578A serves the sponsored content to subscriber 104A over com links 17A and 11A, per task 513.

Data usage is monitored (byte counted) in data counter 244 in accordance with task 515. The sponsored content is zero rated by MNO 102A so there is no charge to subscriber 104A.

Data usage is reported to billing and reporting subsystem 250 over com link 19A. A bill is prepared by $SDS_{h.e.}$ 500 for the amount of sponsored data usage and sent directly to sponsor A over com link 23 (see task 517). Invoicing will occur on some periodic (e.g., monthly, etc.) basis.

$SDS_{h.e.}$ 500 interacts with subscriber 104B, MNO 102B, ISP 108B, and sponsor B in the same fashion as discussed above with respect to subscriber 104A, MNO 102A, ISP 108A, and sponsor A to provide subscriber 104B with access to sponsored data.

Figure 6:
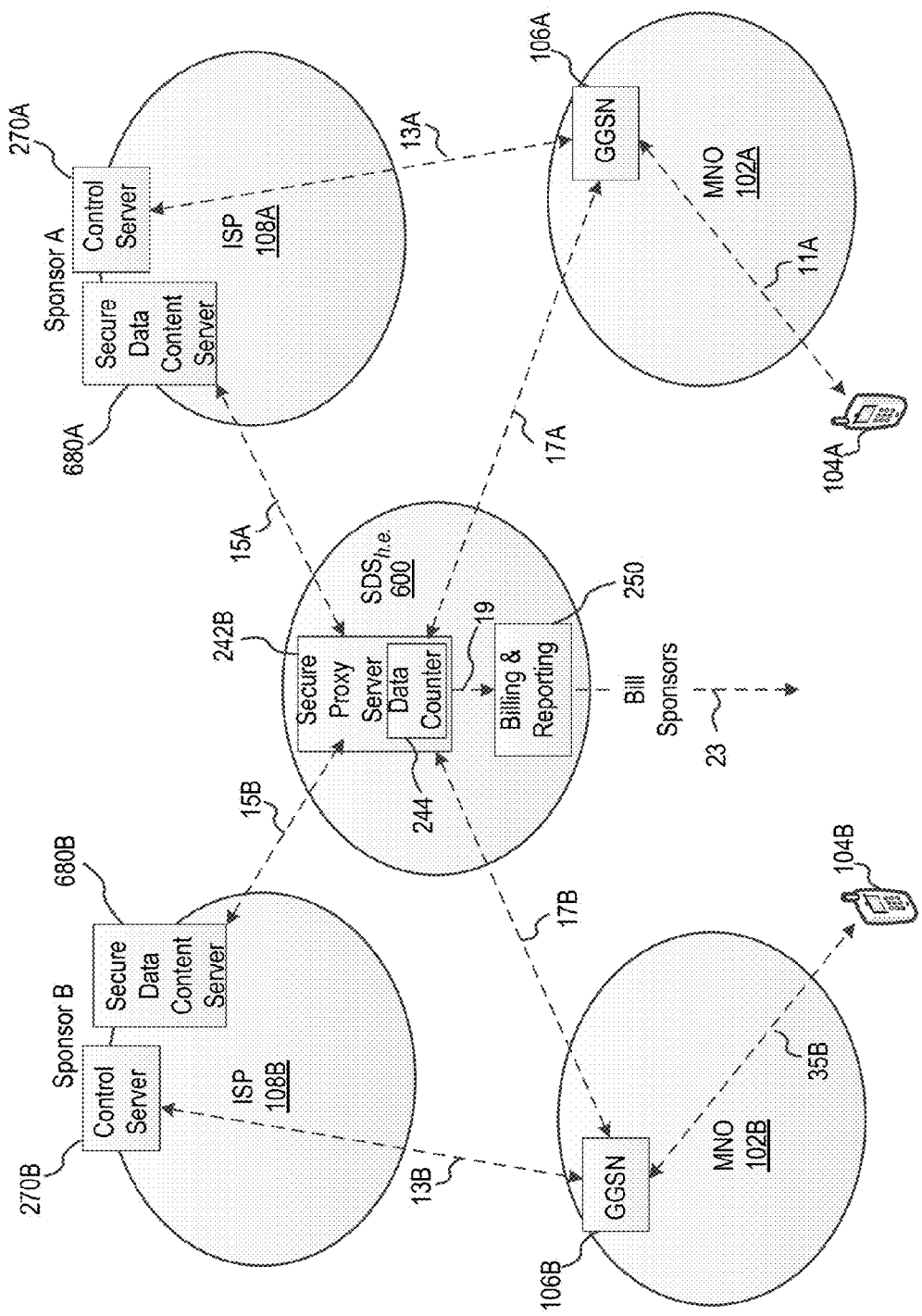
FIG. 6 depicts an embodiment of a sponsored data service/system in accordance with the present teachings.

FIG. 6 depicts yet a further embodiment of a hub-and-exchange sponsored data service/system $SDS_{h.e.}$ 600 in accordance with the present teachings.

In FIG. 6, $SDS_{h.e.}$ 600 is used in conjunction with two MNOs 102A and 102B, two ISPs 108A and 108B, two sponsors A (control server 270A and secure content server 680A) and B (control server 270B and content server 680B).

In this embodiment, $SDS_{h.e.}$ 600 is configured to sponsor applications wherein secure HTTP sessions using HTTPs are required (e.g., shopping carts, etc.). Providing the functionality of the other embodiments (e.g., monitoring, billing, etc.) is problematic since the sponsored data service/system will have little or no access to the contents of the secure data stream in order to make decisions on routing, monitoring, billing etc. For HTTPs, the sponsored data service/system only has access to the source and destination IP addresses; everything else is encrypted.

In accordance with some embodiments of the present invention, this problem is addressed by having secure proxy server 242B terminate the original HTTPS session, then originate a new secure session back to the sponsored data origin (i.e., the sponsor's content server) or serve content from local cache (i.e., a replica server in a CDN). This architecture and methodology is effectively the same as presented in conjunction with $SDS_{h.e.}$ 300 depicted in FIGS. 3A and 3B, with the exception of secure proxy server 242B replacing proxy server 242A.

A security certificate management function (as part of the asset management functionality) is required since the data is arriving at $SDS_{h.e.}$ 600 as HTTPs. As previously indicated, incoming sponsored data passes is byte counted in data counter 244 and then terminated on secure proxy server 242B. The proxy server then forwards the data to the sponsored data origin or the subscriber depending on the direction of the flow.

In all secure scenarios (i.e., HTTPs or VPN), IP addresses, rather than URLs, must be used to identify sponsored data. In such embodiments, the SDS presents a virtual IP address to the MNO (during on-boarding) that gets white-listed.

It is notable that to provide certain types of sessions, such as a "shopping cart," an additional requirement on $SDS_{h.e.}$ 600 is that it should be PCI compliant so that it does not break the trust relationship between the subscriber and the sponsor.

$SDS_{h.e.}$ 600 is operated in the same manner as depicted in FIG. 3B for $SDS_{h.e.}$ 300.

Figure 7:
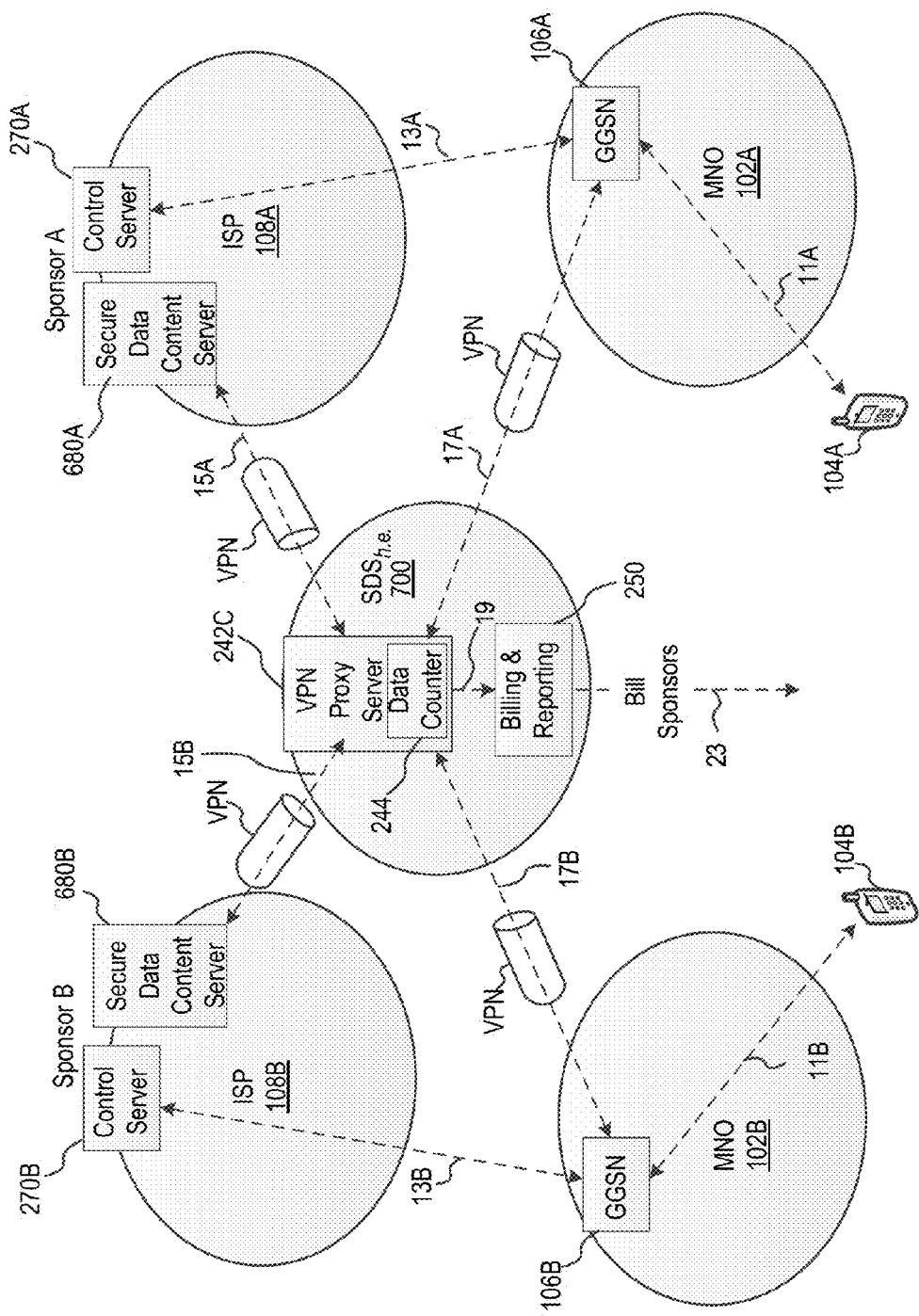
FIG. 7 depicts an embodiment of a sponsored data service/system in accordance with the present teachings.

FIG. 7 depicts $SDS_{h.e.}$ 700, which includes VPN proxy server 242C. Unlike the previous embodiment with HTTPs proxy server 242B, in a VPN, the secure stream is not terminated. In this embodiment, $SDS_{h.e.}$ 700 effectively functions as a transparent proxy, merely forwarding data and byte count. The VPN may be required for certain B2E applications.

There are basically two application components—client side and server side—to a sponsored data session.

On the client side is a software application running on the mobile user's phone. In some embodiments, this is mobile App; in some others, it's a browser. This application is responsible for all user interaction via the SDS and communicates with the server side, to seek approval for data access and to retrieve and display sponsored content. The server side includes the sponsor's web application server and the SDS proxy server. The server side is responsible for authenticating/approving a user and for serving up the sponsored content. Furthermore, the server side is responsible for counting the sponsored data bytes and then billing the sponsors for the requisite amount of data.

Figure 8:
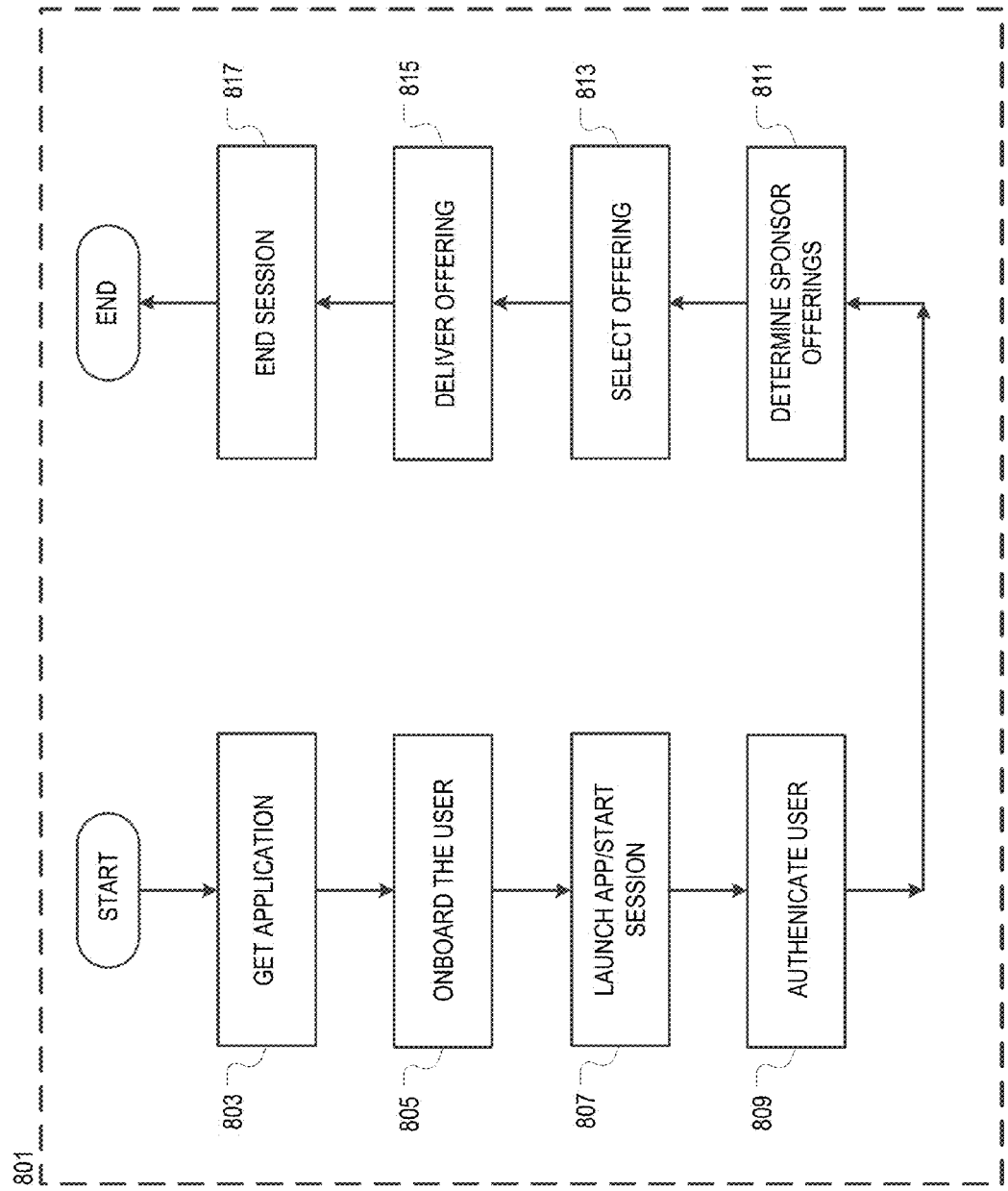
FIG. 8 depicts a block flow diagram of a method for accessing sponsored data in accordance with the present teaching.

FIG. 8 depicts method 801 for conducting a sponsored data session. Task 803 requires obtaining the client side application. This can be accomplished in any one of several ways. In some embodiments, the process begins by opening the browser in the mobile user equipment and visiting the sponsor's website via a published URL. The subscriber then downloads and installs the App on the mobile UE. In some other embodiments, the process begins with the subscriber directly visiting the Android App store or iTunes store and selecting, downloading, and installing the App on the mobile user equipment.

If the mobile user wishes to access sponsored content, then at task 807, the App is launched and a session is initiated. Assuming the App is still active from task 805, information is gathered from the mobile UE (e.g., credentials, etc.) and the request is routed to application server for the sponsored link. The server receives the session request and prepares to authenticate the mobile user in task 809. Alternatively, this could be performed using a cookie.

At task 811, the system determines which content can be sponsored for the subscriber during the session based on certain criteria (e.g., location of user, the home MNO, calendrical time, etc.). It might be that all, some, or none of the content is available to be sponsored for the mobile user. If no sponsored content is available to the mobile user, then the App is either redirected to an unsponsored site or the session is ended. If some or all of the sponsored content is available to the mobile user, they are redirected to a page that provides the desired content or links to options, if they exist.

At task 813, the mobile user loads the redirect page. The content may be delivered from the origin (i.e., the sponsor's server) through the SDS proxy server or from a cached location. At this point, an advertisement could be displayed. If there is only one offer, the mobile user views it; if there are multiple offers, the user selects the desired link.

At task 815, the sponsored content is streamed (from source or cache) to the App on the subscriber's phone. The App renders, for example, video in the phone's display. The content streams until an end session condition is reached. The SDS logs the session and counts bytes. At task 817, the session ends.

It is to be understood that many variations of the invention can easily be devised by those skilled in the art after reading this disclosure and that the scope of the present invention is to be determined by the following claims.

What is claimed:

1. A method for providing access to sponsored data, wherein the method comprises:
    on-boarding a first mobile network operator (MNO) by transmitting an MNO-independent top level domain (TLD) from a first server to the first MNO, wherein the TLD is associated with sponsored data and is used by the first MNO to zero rate any data passing through the first mobile network that is associated with the address, and wherein, if any further MNOs are on-boarded, the first server transmits to said further MNOs the same MNO-independent TLD that was transmitted to the first MNO, thereby enabling said further MNOs to zero rate any data associated with the MNO-independent TLD to the extent such data is passim through respective networks of the further MNOs;
    on-boarding a first sponsor by transmitting a first unique identifier and the TLD from the first server to the first sponsor, wherein the first unique identifier and the TLD are concatenated, the first unique identifier as a prepend, generating a first fully qualified domain name (FQDN), and wherein the first FQDN is not provided to the first mobile network operator;
    monitoring, at a second server, usage of data associated with the first FQDN; and
    preparing, at a third server, a bill, wherein the bill is based on the monitored usage.

2. The method of claim 1 wherein the monitored usage is chargeable to the first sponsor and the bill is transmitted from the third server to the first mobile network operator.

3. The method of claim 1 wherein the monitored usage is chargeable to the first sponsor and the bill is transmitted from the third server to the first sponsor.

4. The method of claim 1 wherein on-boarding the first sponsor further comprises generating the first unique identifier.

5. The method of claim 4 wherein on-boarding the first sponsor further comprises generating the first unique identifier at the first server.

6. The method of claim 1 wherein the first server concatenates the first unique identifier and the TLD.

7. The method of claim 1 and further comprising:
    on-boarding a second sponsor by transmitting a second unique identifier and the TLD from the first server to the second sponsor, wherein the second unique identifier and the TLD are concatenated, generating a second FQDN, wherein the second FQDN is not provided to the first mobile network operator;
    monitoring, at the second server, usage of data associated with the second FQDN; and
    preparing, at the third server, a bill, wherein the bill is based on the monitored usage associated with the second FQDN.

8. The method of claim 7 wherein the second sponsor is on-boarded after the first mobile network operator is on-boarded.

9. The method of claim 1 and further comprising transmitting the TLD from the first server to a second mobile network operator, wherein the TLD is associated with sponsored data and is used by the second mobile network operator to zero rate any data passing through the second mobile network that is associated with the TLD.

10. A method for providing access to sponsored data, wherein the method comprises:
    on-boarding plural mobile network operators by transmitting a top level domain (TLD) that is the same for each of said operators from a first server to each of the plural mobile network operators, wherein the TLD is associated with sponsored data and is used by the plural mobile network operators to zero rate any data passing through the networks thereof that is associated with the TLD;
    on-boarding plural sponsors by transmitting to each such sponsor, from the first server, the TLD and an identifier that is unique to each sponsor, wherein the unique identifier is concatenated, as a pre-pended, to the TLD, thereby generating unique FQDNs for each of the sponsors, wherein each unique FQDN is indicative of sponsored data and the sponsor thereof, and wherein the FQDNs are not provided to the plural mobile network operators;
    monitoring, at a second server, usage of data associated with the FQDNs; and
    preparing, at a third server, bills, wherein each bill is associated with one of the FQDNs and is based on the monitored usage associated therewith.

11. A method for providing access to sponsored data comprising:
    receiving, at a proxy server, a request for first sponsored data from a first mobile subscriber and a request for second sponsored data from a second mobile subscriber, wherein a first sponsor is associated with the first sponsored data and a second sponsor is associated with the second sponsored data;
    serving, from the proxy server, the first sponsored data to the first mobile subscriber and the second sponsored data to the second mobile subscriber;
    monitoring, in the proxy server, a first amount of the first sponsored data being served and a second amount of the second sponsored data being served, wherein associated with the first and second sponsored data is (1) a common TLD, which is the same for both the first and the second sponsored data; and (2) a unique pre-pend, which is different for the first and the second sponsored data and that identifies the first sponsor and the second sponsor.

12. The method of claim 11 wherein the serving further comprises the proxy server requesting the first sponsored data from a first content server and the proxy server requesting the second sponsored data from a second content server.

13. The method of claim 11 wherein the first content server is accessible via a first internet service provider and the second content server is accessible via a second internet service provider.

14. The method of claim 11 wherein the proxy server is a replica server and further wherein, when the first sponsored data is available in a cache accessible to the replica server, the replica server serves the first sponsored data to the first mobile subscriber.

15. The method of claim 11 wherein the serving further comprises the proxy server requesting the first sponsored data from a first content server and receiving the first sponsored data from a replica server that is part of a content delivery network.

16. The method of claim 11 wherein the first mobile subscriber is a subscriber of a first mobile network and the second mobile subscriber is a subscriber of a second mobile network.

17. The method of claim 1 wherein the TLD is a mobile network operator-independent IP address.

18. The method of claim 10 wherein the TLD is a mobile network operator-independent IP address.

19. The method of claim 11 wherein the TLD is a mobile network operator-independent IP address.

* * * * *